(12) United States Patent
Halanski et al.

(10) Patent No.: US 12,471,961 B2
(45) Date of Patent: Nov. 18, 2025

(54) VERTEBRAL GROWTH MODULATING DIRECTIONAL HINGED END-TO-END ROD CONNECTOR

(71) Applicant: Phoenix Children's Hospital, Phoenix, AZ (US)

(72) Inventors: Matthew A. Halanski, Scottsdale, AZ (US); Cameron Jeffers, Mesa, AZ (US)

(73) Assignee: Phoenix Children's Hospital, Inc., Phoenix, AZ (US)

( * ) Notice: Subject to any disclaimer, the term of this patent is extended or adjusted under 35 U.S.C. 154(b) by 0 days.

(21) Appl. No.: 18/742,873

(22) Filed: Jun. 13, 2024

(65) Prior Publication Data

US 2024/0415548 A1 Dec. 19, 2024

Related U.S. Application Data

(60) Provisional application No. 63/545,522, filed on Oct. 24, 2023, provisional application No. 63/472,672, filed on Jun. 13, 2023.

(51) Int. Cl.
*A61B 17/70* (2006.01)
*A61B 17/68* (2006.01)

(52) U.S. Cl.
CPC ...... *A61B 17/7035* (2013.01); *A61B 17/7023* (2013.01); *A61B 2017/681* (2013.01)

(58) Field of Classification Search
CPC . A61B 17/70; A61B 17/7025; A61B 17/7023; A61B 17/7035; A61B 17/80; A61B 17/8042; A61B 17/809
See application file for complete search history.

(56) References Cited

U.S. PATENT DOCUMENTS

| | | | |
|---|---|---|---|
| 9,113,961 B2* | 8/2015 | Larroque-Lahitette | A61B 17/7056 |
| 10,687,861 B2* | 6/2020 | Perry | A61B 17/7049 |
| 11,547,450 B2* | 1/2023 | Arnin | A61B 17/7004 |

* cited by examiner

Primary Examiner — Christopher J Beccia
(74) Attorney, Agent, or Firm — Messner Reeves LLP (57) ABSTRACT

A first and second pedicle screw may be screwed into a first and second corresponding spine vertebra. A first end of a first spinal rod and a first end of a second spinal rod may be connected to a corresponding first and second opening in a distraction hinge. A rod-to-hinge connector may be positioned between the ends of the spinal rods and the openings in the distraction hinge if desired. A second end of the first spinal rod and a second end of the second spinal rod may be placed in a head of the corresponding first and second pedicle screws and attached using tip set screws. A tip set screw may be screwed into the distraction hinge to compress an internal spring that causes a distraction force that separates the first spine vertebra from the second spine vertebra and enables a center of rotation away from a vertebral cortex.

20 Claims, 10 Drawing Sheets

VERTEBRAL GROWTH MODULATING DIRECTIONAL HINGED END-TO-END ROD CONNECTOR

CROSS REFERENCE TO RELATED APPLICATIONS

This patent application claims the benefit of U.S. Provisional Application No. 63/545,522, filed Oct. 24, 2023, titled Vertebral Growth Modulating Directional Hinged End-to-End Rod Connector, which claims the benefit of U.S. Provisional Application No. 63/472,672, filed Jun. 13, 2023, titled Vertebral Growth Modulating Directional Hinged End-to-End Rod Connector, which are fully incorporated herein by reference as if fully set forth herein.

FEDERAL RESEARCH STATEMENT

This invention was made with government support under contract 1R21AR078528-01A1 awarded by National Institutes of Health (NIH). The government may have certain rights in the invention.

FIELD OF THE INVENTION

The present invention generally relates to a spine growth modulation system.

BACKGROUND

Spinal deformities requiring surgical intervention occur with an incidence rate of 1 in 1000 children. Current standard of care involves spinal fusions which eliminate all spinal growth and motion through the instrumented vertebral levels. Spinal growth modulation has been used over the past 5-10 years in an attempt to make a crooked spine grow straight and maintain motion, however, early clinical results in children with deformed spines have not matched results of pre-clinical animal testing.

SUMMARY OF THE INVENTION

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

The present invention generally relates to a spine growth modulation system. A first pedicle screw may be screwed into a first spine vertebra along the outer curved surface of a curved spine. A second pedicle screw may be screwed into a second spine vertebra along the outer curved surface. A first end of a first spinal rod may be connected to a first opening in a distraction hinge using a first swage pin and a first end of a second spinal rod may be connected to a second opening in the distraction hinge using a second swage pin.

A second end of the first spinal rod may be placed in a head of the first pedicle screw and attached therein using a first pedicle screw tip set screw and a second end of the second spinal rod may be placed in a head of the second pedicle screw and attached using a second pedicle screw tip set screw. A distraction hinge tip set screw may be screwed into the distraction hinge to compress a distraction hinge spring that pushes on the first end of the first spinal rod and the first end of the second spinal rod to cause a distraction force on the first spine vertebra and the second spine vertebra.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

The present invention generally relates to a spine growth modulation system. Various modifications, alterations, and permutations of the disclosed implementations can be made and will be readily apparent to those skilled in the art, and the general principles defined may be applied to other implementations and applications, without departing from scope of the disclosure. The present disclosure is not intended to be limited to the described or illustrated implementations, but to be accorded the widest scope consistent with the described principles and features.

For the purposes of promoting an understanding of the principles of the present disclosure, reference will now be made to the exemplary embodiments illustrated in the drawing(s), and specific language will be used to describe the same.

Appearances of the phrases an "embodiment," an "example," or similar language in this specification may, but do not necessarily, refer to the same embodiment, to different embodiments, or to one or more of the figures. The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps unless explicitly stated otherwise.

Spinal deformity surgery is one of the most complex surgical procedures performed by pediatric orthopedic surgeons. Approximately 16,000 children each year in the US are hospitalized for treatment of their spinal deformities. Current interventions are among the costliest (>$100,000/procedure) and riskiest of all orthopedic interventions with complications including infection, nerve injury, paralysis, and death. Estimates between 1-8% of the population have spinal deformities with 1 in 1000 children in the population having deformities severe enough to require operative treatment. Thus, spinal deformities are a relatively common pathology affecting children who are left with the consequences of its treatments for the remainder of their lives.

Regardless of underlying cause, the current surgical "standard of care" for a large (Cobb angle >45-50° scoliosis, 75° kyphosis) and progressive spinal deformity in an adolescent is an instrumented spinal fusion. Instrumentation includes metal screws, hooks, or cables that are fixed to the spine and joined to metal rods. Instrumentation immediately improves vertebral alignment and allows each vertebra to heal to the adjacent vertebrae resulting in a "fusion." As the goal of this surgery is to obtain fusion between vertebrae, all motion and growth over the operative segments are lost over the instrumented levels. This may vary from ⅓ to nearly all motion segments being lost from the spine. While the true long-term effects are unknown, it is generally believed that the longer the fusion, the more premature wear the remaining spinal segments will encounter. As these procedures are performed on active children with 50-70 years of life remaining, limiting fusion levels is important. In addition to these long-term consequences, catastrophic neurologic injuries may occur and thought to be a result of spinal cord ischemia during curve correction. The risk of immediate complications and potential long-term morbidity associated with the current procedures, has led to the search for more gradually corrective and motion friendly alternatives.

"Guided growth" is a concept that has existed for over fifty years in pediatric orthopedics. The fundamental concept of this technique is to harness the body's own growth potential to correct angular deformities. By asymmetrically restricting the growth of a physis (at the convexity or apex), angular deformities can be corrected in growing children. The effectiveness of these minimally invasive procedures in the limbs has replaced the much more morbid corrective osteotomies and led to expanded use. The success in treating limb deformities has led to strong interest in adapting these principles into the spine, in hopes to decrease the morbidity of current spinal deformity procedures.

Despite the similarities between the angular deformities found in the lower extremity and spine of growing children, there are profound structural differences that complicate direct extrapolation of current guided growth techniques into the spine. Much of current guided growth procedures take place at the distal femur and proximal tibia. Under physiologic circumstances, motion through these physes, is minimal allowing the rigid guided growth implants (metal plate) to span the cartilaginous growth plate with fixation screws placed in the boney epiphysis and metaphysis. The anatomy of the vertebral endplate however, does not readily allow the same surgical approach as the epiphysis lies immediately adjacent to the intervertebral disk space and is thin (in swine) and remains completely cartilaginous in humans. Consequently, the vertebral epiphysis cannot be safely instrumented in the same manner without risking injury to the disc or the physis. Therefore, flexible vertebral physeal tethers are placed spanning the disc space, including both the distal and proximal physes of two adjacent vertebrae as well as the disc. This causes asymmetric loads, intended to be focally and asymmetrically applied to the physis, to be also transmitted through the disc, a structure which normally functions to distribute compressive loads across the endplate and allow motion. Despite these differences, the flexible spinal tethers, have been effective at inducing spinal deformities in animal models, but have been less reliable at correcting deformities in actual spinal deformity patients.

While early clinical studies have demonstrated the overall safety of spinal growth modulation procedures, the current strategies to actually correct spinal deformities have not matched the effectiveness reported in the preliminary animal studies. Younger patients, with smaller curves have benefitted the most, although the growth response appears quite unpredictable, as some failed to respond, while others overcorrected and developed curves in the opposite direction. Nearly all clinical studies have demonstrated that the majority of curve correction was obtained through immediate deformation at the vertebral disc at the time of tether placement, rather than the actual vertebral growth modulation thought necessary to provide durable long-term correction and may contribute to the high number (~50%) of observed implant failures using current techniques. Despite short-term successes having only been achieved in 59-74% of cases and having inferior curve correction when compared with spinal fusion, these procedures continue to be performed. Given this body of clinical data, it is essential to further elucidate the differences in growth modulation requirements for the deformed spines of children versus the straight, healthy spines of animals in pre-clinical testing.

The invention is based on four scientific premises: (1) Growth modulation is dependent on the compressive force applied to a physis. Previous studies have clearly demonstrated a linear rate of growth inhibition due to compression at the vertebral physis with 17% reduction in longitudinal growth per 0.1 MPa (14.6 psi) and showed that all growth ceases after 0.6 MPa (87.6 psi). These estimates are based on the growth potential of a non-deformed vertebral physis, under normal physiologic conditions. (2) Intervertebral disc properties and baseline vertebral physeal growth patterns differ between normal and deformed spines. Clinical experience, further supported in the literature, clearly demonstrate that the baseline growth and biomechanical properties of the normal and deformed spine differ, thus the response of each spine to the same eccentrically placed load will be different. Preliminary mathematical modeling supports this as the efficiency of the tether is predicted to diminish as the vertebral deformity increases. Such differences are irrelevant in the preliminary animal studies reporting the effectiveness of tethers to induce a deformity in uniformly growing, straight spines, but such fundamental differences likely contribute to the observed variable clinical outcomes. (3) Carefully controlled tether tensions (force) applied in animal studies contrast with the arbitrary tensions applied during human surgeries. (4) The immediate improvement in spinal alignment via subjectively applied manual tension to the tether at the time of surgery may also contribute to the variable clinical results. By gaining immediate deformity correction, tether tension is displacement controlled (based on the movement of screws and vertebrae), rather than load controlled, as was used in the earlier animal studies where this variable was appropriately controlled. Thus, arbitrarily increased tether load (in attempts to straighten the spine at time of surgery) likely generates variable and possibly excessive stress across the disc space, reducing overall vertebral growth, and thus minimizing the differential growth effects of the tether across the endplate.

Initial testing of tethering on a unique deformed spine model inferred that compression alone would not be the ideal manner to modulate growth. Designing a device that could relatively distract or unload the concave portion of a curve, rather than just compress the convex portion of the curve, should mitigate the stress distributing powers of the intervertebral disc (whose native function is to minimize stress distribution across the endplate) and maximize stress distribution (and therefore differentially modulate growth to correct the deformity.

In various embodiments, the present system is configured to differentially exert stress across the intervertebral endplate to differentially modulate growth of the vertebra, to NOT rely on compression alone, but rather use distractive, rotational, and compressive forces to modulate growth, to allow growth of the vertebrae and control or modulate that growth in a manner that corrects deformities, to allow certain motion and growth to encourage corrective growth without spinal fusion, to allow titration of forces applied to spinal instrumentation to maximize effect and minimize hardware failure, and to interact with current common spinal implantation techniques and instrumentation, and combinations thereof.

Current spinal growth modulating devices rely on compression, either using a fixed device (metal/nitinol staple) or a flexible device (screws and flexible tape/rope), to either compress across the disc space to slow growth on the convexity of the curve and allow growth on the concavity. Prior testing and analysis of this technique demonstrates that it works much better to "deform" a straight animal spine in pre-clinical testing, than it has in correcting deformed spines clinically. After years of considering what was different between these two states, it has become apparent that the center of rotation of the "system" and the "vertebral bodies" were different between the straight and deformed spine, and how they would respond to a simple compressive force.

For a straight spine, any compression moves the center of rotation from the nucleus pulposis (center of the vertebral body posteriorly). This occurs until the posterior (or compressed) corners of the vertebral bodies touch. In this model, stress distribution is observed across the growth plate and growth modulation would be expected and has been demonstrated in pre-clinical animal testing. However, in the deformed spine, the center of rotation of the system starts anterior or at the anterior (concave) border of the vertebral body and migrates posteriorly with increasing compression through the tether. During this migration, the disc is compressed across the endplate and differential stress distribution is minimally observed, meaning differential growth is unlikely to occur.

In current techniques for spinal curvature correction, the center of rotation is located along the vertebral endplate and only migrates posteriorly when significant pressure has been applied and the concave soft tissues allow distraction.

Using this information, a system has been devised that does not depend only on compression but would move the center of rotation of the "system" (instrumentation and vertebral body), past the cortex of the convexity.

Spinal deformity surgery is one of the most complex surgical procedures performed by pediatric orthopedic surgeons. While current treatments have been successful, they eliminate motion and spinal growth. Due to these limitations, strategies to modulate spinal growth have been developed. Growth is modulated across a growth plate when a gradient of stress is created across that growth plate. That growth is inhibited by compression and encouraged by distraction. Current guided growth strategies depend on flexible tethers that can only impart a compressive force to modulate growth. This is enough to deform a straight spine, but not enough to effectively distribute stress across a deformed spine. The invention may allow stress to be distributed across a deformed spine by using a non-compressible tether (rods connected to a hinge) that moves the center of rotation of the vertebral system, outside of that system and beyond the convex vertebral cortex. By doing so, quantifiable forces including compression, distraction, and rotation can be applied to the spine, that in turn increase the stress distribution across a deformed vertebral growth plate. The unique design of our implant allows it to interface with other currently used spinal devices to impart these desired forces on the growth plates in a very predictable fashion.

Figure 4:
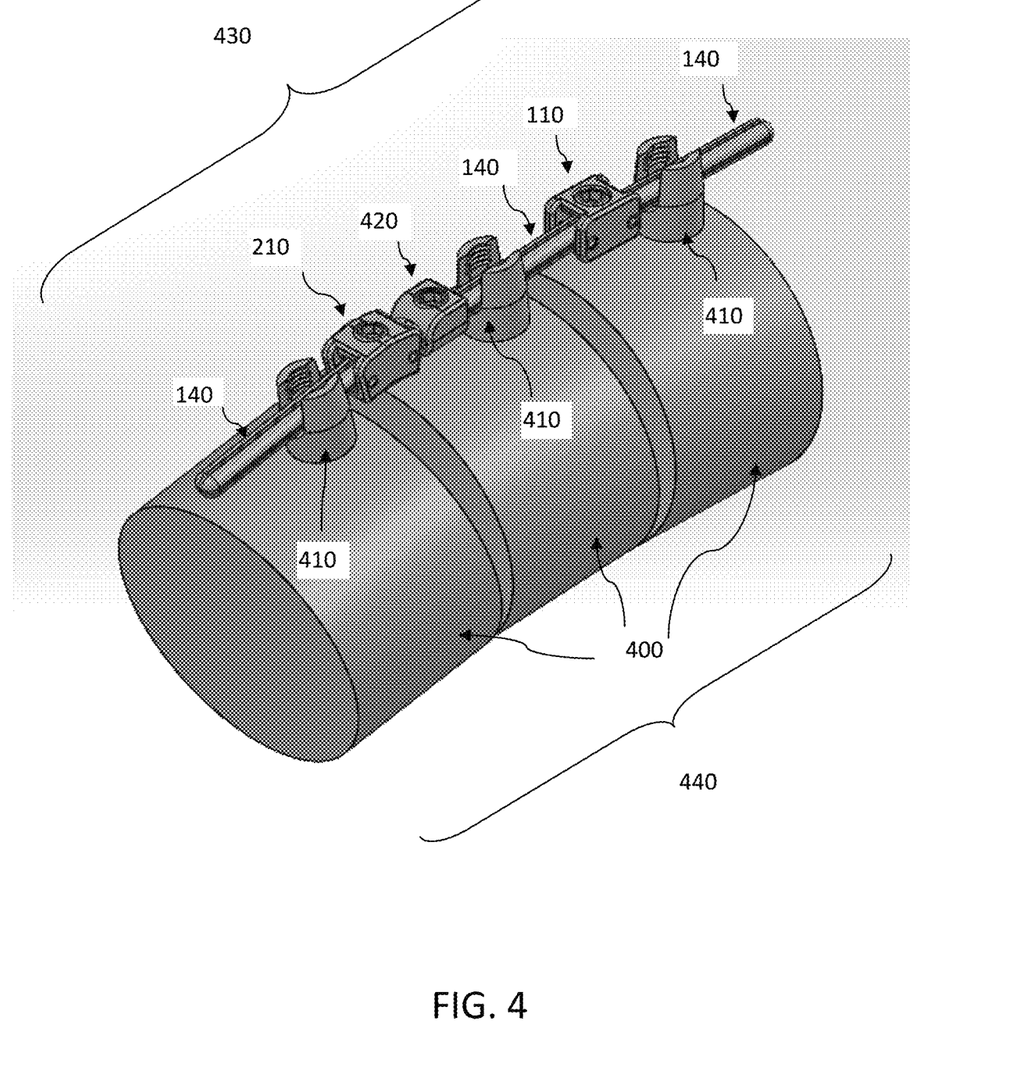
FIG. 4 depicts a perspective view of an embodiment of the invention that has been attached to spine vertebrae in a curved spine before a distraction biasing force is applied to the spine vertebrae.
Figure 7:
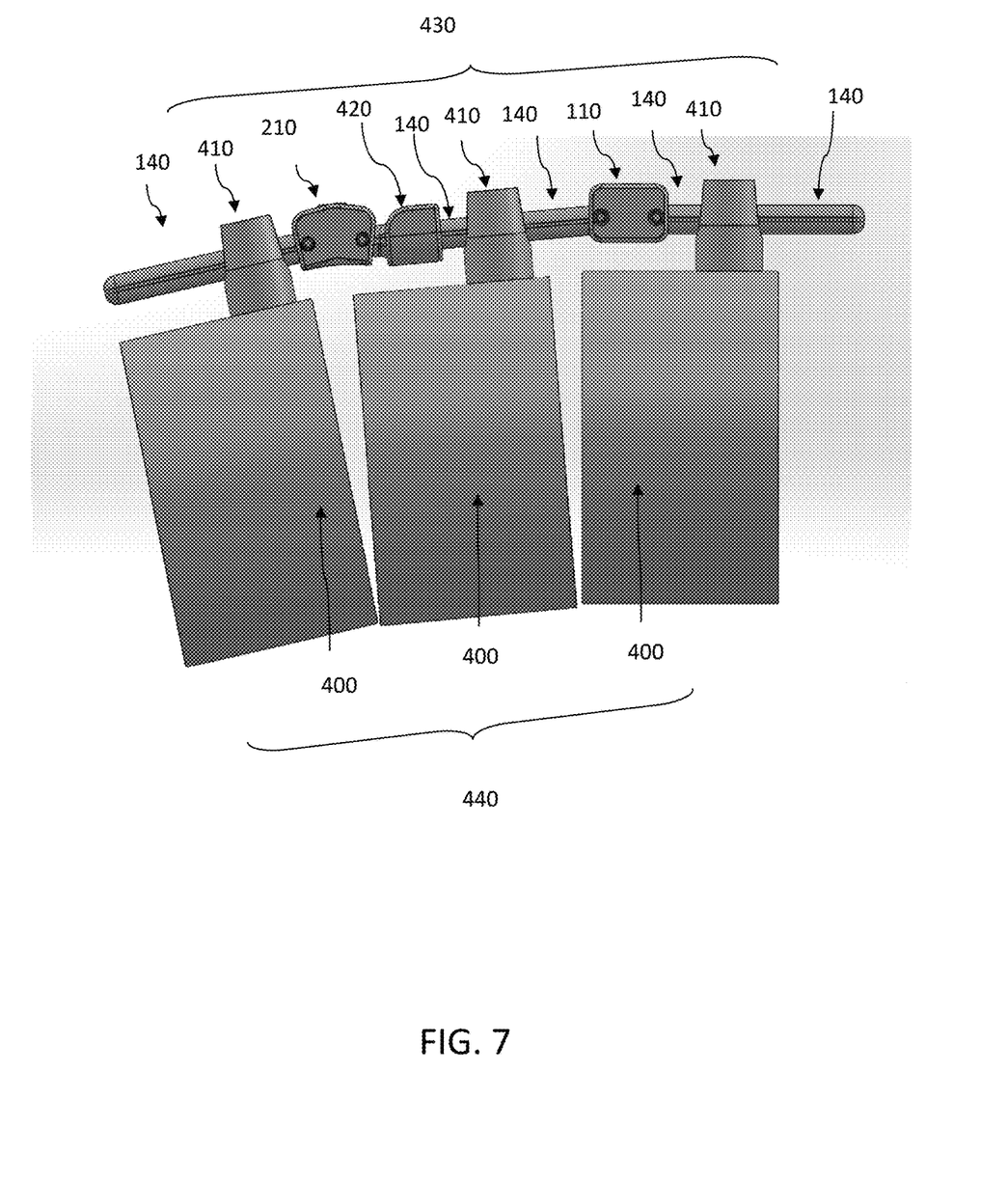
FIG. 7 depicts a side view of an embodiment of the invention that has been attached to spine vertebrae in a curved spine before a distraction biasing force is applied to the spine vertebrae.

Referring to FIGS. 4 and 7, a device for correcting spine deformities is illustrated. The illustrated device has been attached to three spine vertebrae 400 of a deformed spine such that it is able to apply a distraction biasing force on the three spine vertebrae 400. The three spine vertebrae 400 have an outer curved surface 430, where the hardware of the present invention is attached, and the three spine vertebrae 400 have an inner curved surface 440. The outer curved surface 430 is where the endplates of the vertebrae 400 are the farthest from each other (at least in relation to a healthy spine curvature) and the inner curved surface 440 is where the endplates of the vertebra 400 are the closest to each other (at least in relation to a healthy spine curvature) or even touching.

A benefit of this device is that it modulates growth rather than mechanically correcting the spine as current tethers do. The device also allows for a very titratable force to be applied to the vertebral system and therefore can be individualized for curves of different "stiffness" i.e., it can be individualized. Thus, a small initial distraction force may be applied by the device for a patient and, depending on the results, the distraction force may be increased or decreased as needed for the patient.

The placement of the device for correcting spine deformities along the outer curved surface 430 of the spine induces a more effective stress distribution across the endplate by compressing it posteriorly (convexity) and distracting it anteriorly (concavity). The present system accomplishes this goal by rigidly fixing the vertebral body through pedicle screws 410 and spinal rods 140 to a distraction hinge 100, 200, such as a straight central housing 110 or an angled central housing 210, that has a center of rotation away from the vertebral cortex. By applying a biasing force by the distraction hinge 100, 200, there is a mismatch in the curvatures of radius between the instrumented system and the vertebral bodies 400 themselves. This mismatch allows distraction, translation AND compression at the vertebral endplate to maximize stress distribution (and growth modulation) across the endplate.

Figure 5:
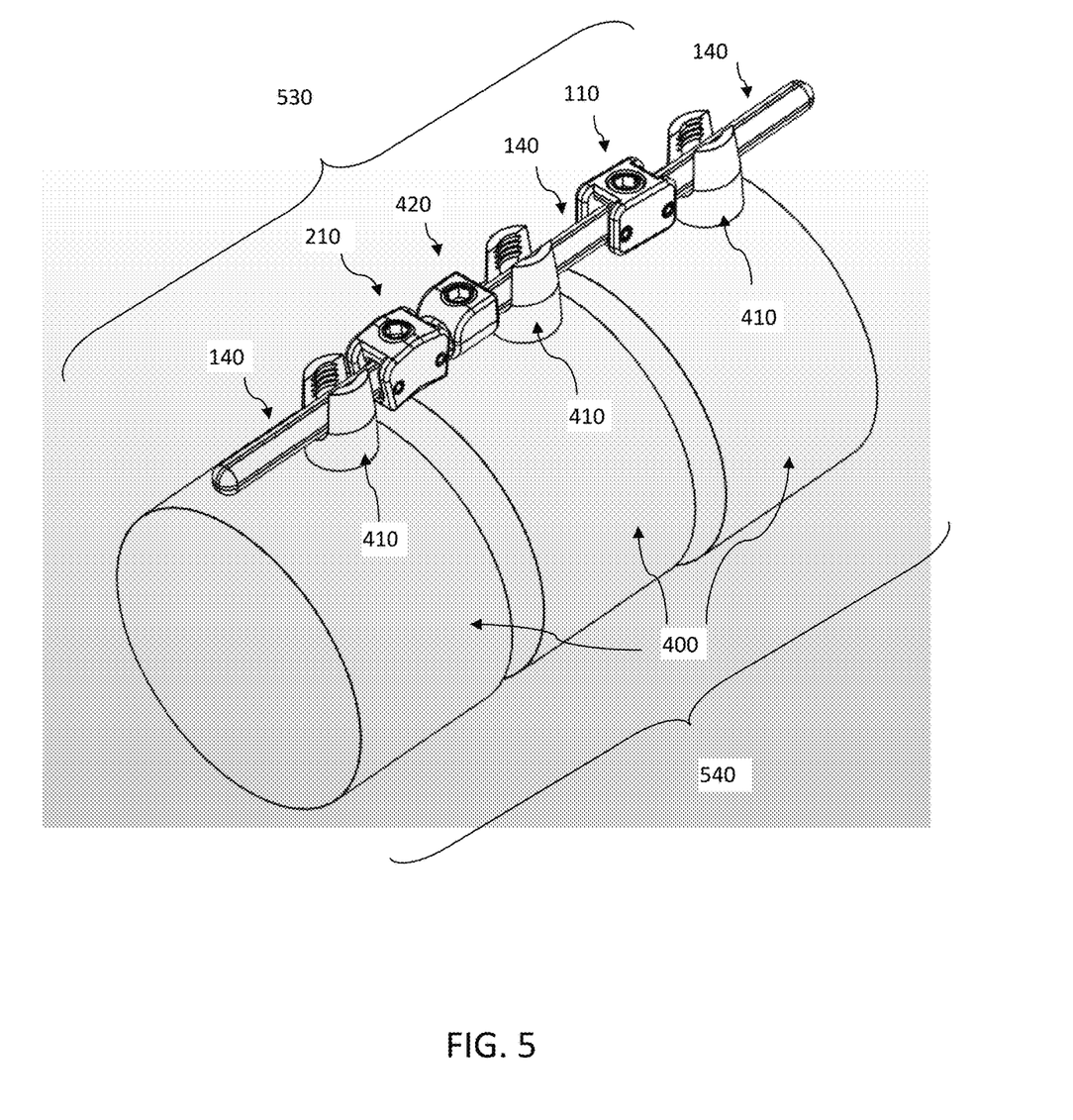
FIG. 5 depicts a perspective view of an embodiment of the invention that has been attached to the spine vertebrae in the curved spine depicted in FIG. 4 after a distraction biasing force has been applied to the spine vertebrae, thereby straightening the spine vertebrae.
Figure 8:
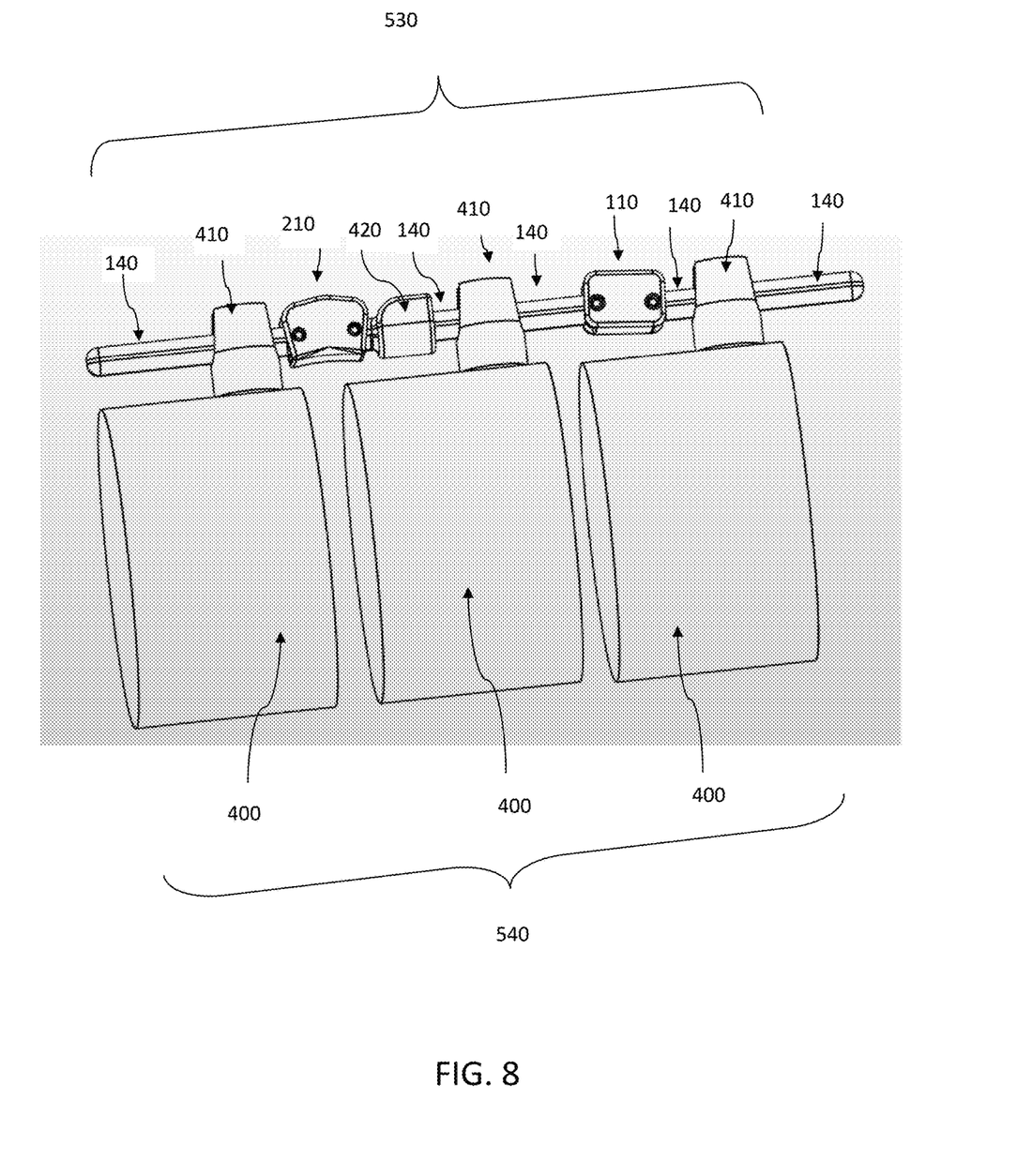
FIG. 8 depicts a side view of an embodiment of the invention that has been attached to the spine vertebrae in the curved spine depicted in FIG. 7 after a distraction biasing force has been applied to the spine vertebrae, thereby straightening the spine vertebrae.

Referring to FIGS. 5 and 8, the device for correcting spinal deformities, i.e., instrumented system of the invention, is attached to three different spine vertebrae 400 in the deformed spine and creates a distraction biasing force between the spine vertebrae 400. The distraction biasing force, over time, will straighten the spine vertebrae 400 so that there is a more uniform distance between the endplates of each vertebra 400. FIGS. 4 and 7 represent a possible starting position of the spine vertebrae 400 at the start of treatment (with a non-uniform distance between the superior end plates and the inferior end plates of the vertebrae) and FIGS. 5 and 8 represent a possible ending position of the spine vertebrae 400 at the end of treatment (with a more uniform distance between the superior end plates and the inferior end plates of the vertebrae). In FIGS. 5 and 8 the deformed outer surface in FIGS. 4 and 7 are now represented by a straightened outer surface 530 and a straightened inner surface of 540 after a successful healing process with the current invention.

FIGS. 4, 5, 7 and 8 illustrate three pedicle screws 410 screwed into three corresponding spine vertebra 400. Each of the pedicle screws 410 has screw threads for attachment to a vertebra 400 and a head portion, possibly with a slot, for receiving an end of a spinal rod 140. A tip set screw 130 may be screwed into the head portion of the pedicle screw 410 to securely retain one end of the spinal rod 140. While FIGS. 4, 5, 7 and 8 illustrate three pedicle screws 410 with three corresponding spine vertebra 400, the present invention may be scaled to work with any desired number of spine vertebrae 400.

Figure 1:
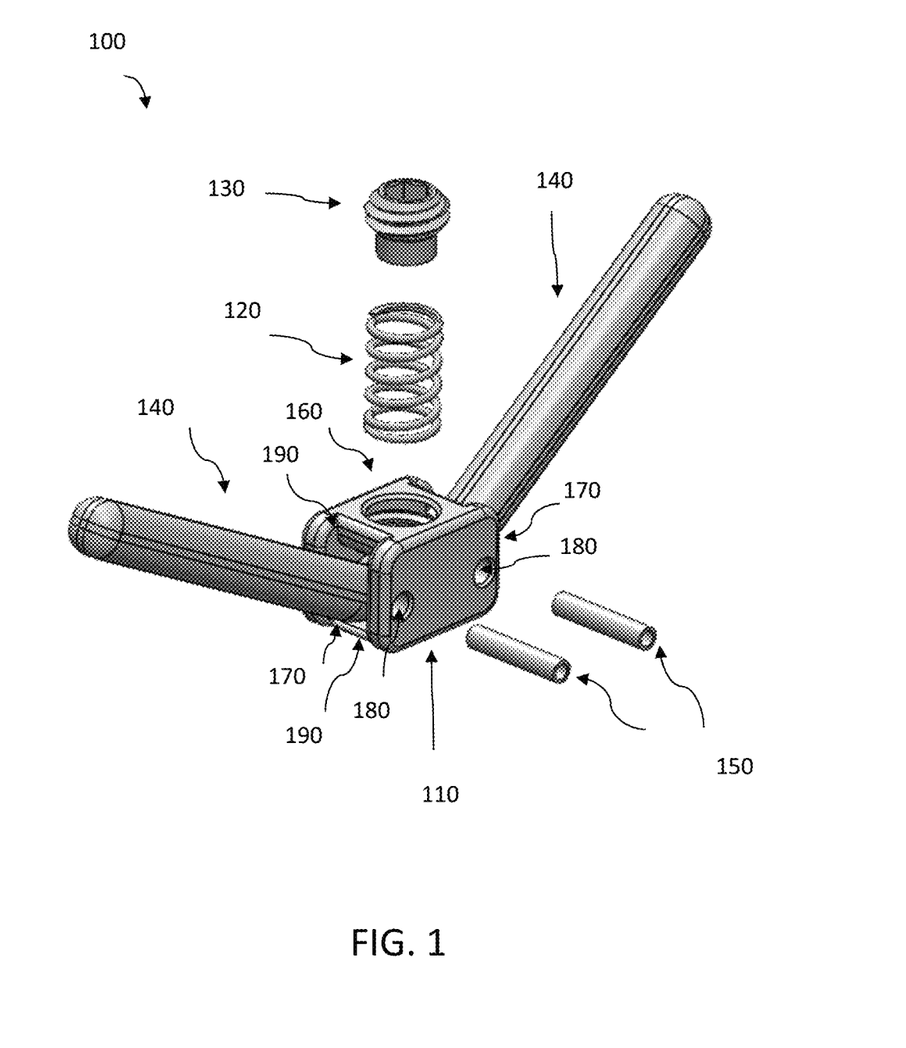
FIG. 1 depicts an exploded view for an assembly for a single level (2 vertebrae) straight central housing.
Figure 2:
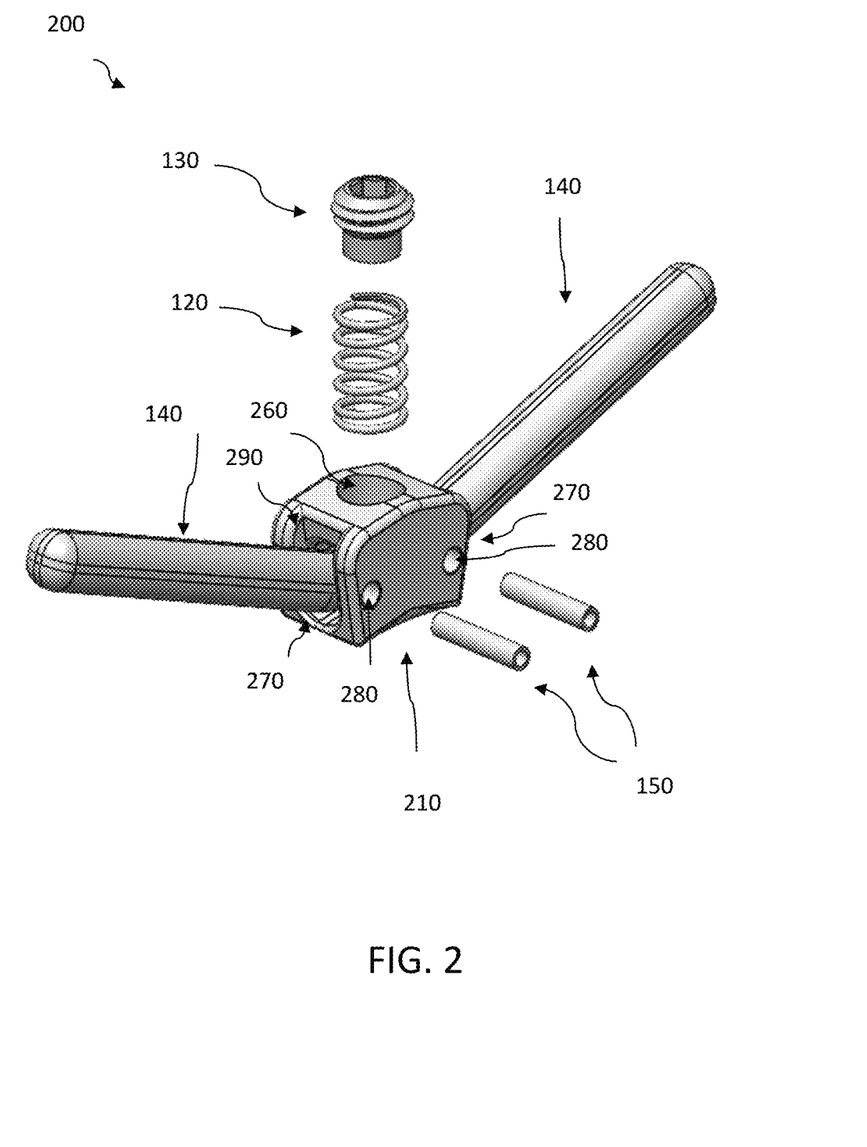
FIG. 2 depicts an exploded view for an assembly for a single level (2 vertebrae) angled central housing.

Referring to FIG. 1, an assembly for a hinge 100 with a straight central housing 110 is illustrated. Referring to FIG. 2, an assembly for an angled central housing 210 is illustrated. The assembly for a straight central housing 110 and the assembly for an angled central housing 210 are two possible types of distraction hinges 100, 200 that may be used as part of the present invention. The assembly for the straight central housing 110 may include a straight central housing 110 and the assembly for the angled central housing 210 may include an angled central housing 210, i.e., a central housing 110, 210.

The straight central housing 110 may include a straight central housing spring sleeve 160, two straight central housing swage pin sleeves 180 and two straight central housing spinal rod sleeves 170. The angled central housing 210 may include an angled central housing spring sleeve 260, two angled central housing swage pin sleeves 280 and two angled central housing spinal rod sleeves 270.

The spring sleeve 160, 260 is configured to receive a compression spring 120 of appropriate size and strength to provide the desired range of distraction forces upon the vertebrae 400. Each swage pin sleeve 180, 280 is configured to receive and securely retain a swage pin 150.

Figure 6:
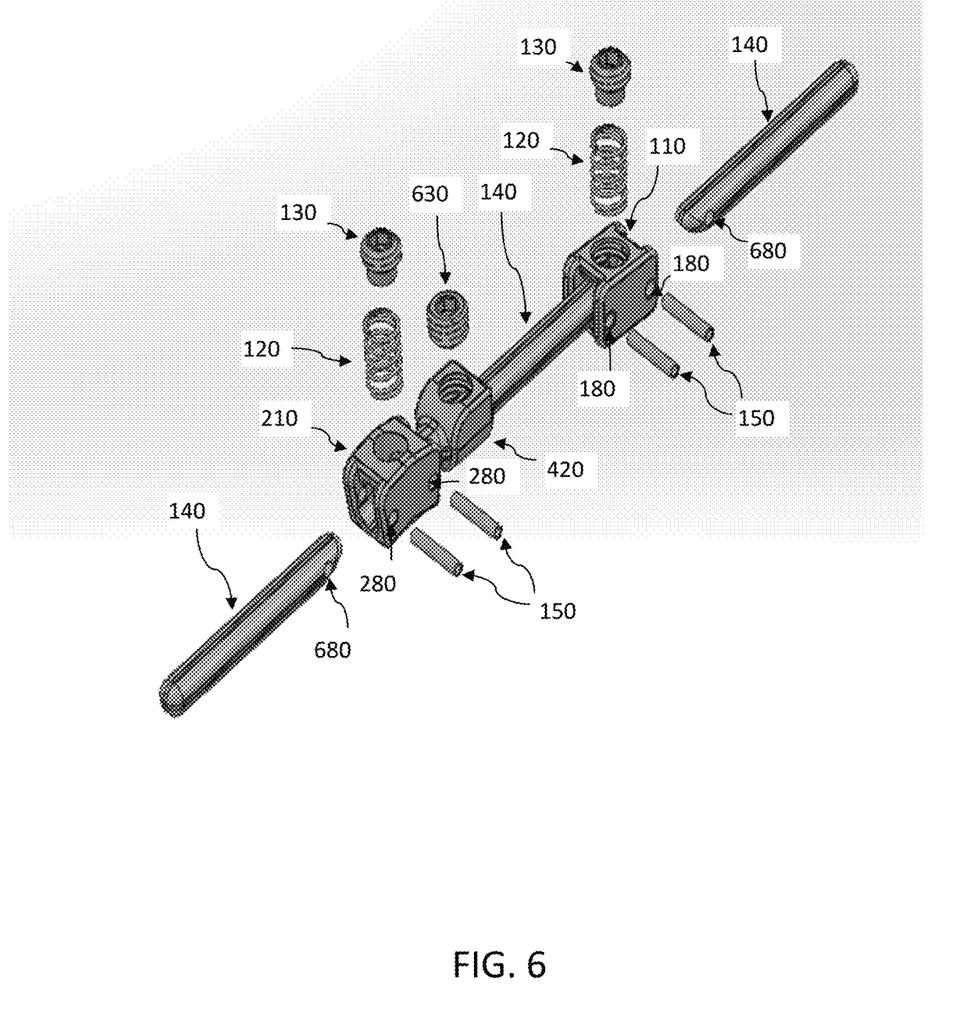
FIG. 6 depicts an exploded view of the hardware that may be used to practice the invention.

Each spinal rod sleeve 170, 270 is configured to receive one end of a spinal rod 140. Referring to FIG. 6, the one end of the spinal rod 140 may have a spinal rod aperture 680. A swage pin 150 may pass through the swage pin sleeve 180, 280 and a spinal rod aperture 380 to retain the one end of the spinal rod 140 in the distraction hinge 100, 200. This configuration may allow the one end of the spinal rod 140 to pivot or rotate within the distraction hinge 100, 200.

The straight central housing 110 may have any desired numbers of slots 190 or notches that permit a greater range of pivoting or rotating motion of the spinal rod 140 in the straight central housing 110. In a preferred embodiment, the straight central housing 110 has a top and a bottom slot 190 that allows the attached spinal rod 140 to have a greater degree of freedom in moving up and down.

The angled central housing 210 may have any desired numbers of slots 290 or notches that permit a greater range of pivoting or rotating motion of the spinal rod 140 in the angled central housing 210. In a preferred embodiment, the angled central housing 110 only has a top slot 290 that allows the attached spinal rod 140 to have a greater degree of freedom in moving up (but not down).

The distraction hinge 100, 200 allows for a connection between two spinal rods 140. Each distraction hinge 100, 200 with its corresponding two spinal rods 140 applies a distraction biasing force between vertebrae 400 which allows corrective vertebral growth between the two vertebrae. One end of each spinal rod 140 is fixed to a different vertebra 400 by a pedicle screw 410 and the other end of each spinal rod 140 is inserted into the spinal rod sleeve 170, 270 of the distraction hinge 100, 200. The device for correcting spinal deformities enables directional motion between two spinal segments 400 and spinal rods 140.

The applied distraction biasing force of the distraction hinge 100, 200 may be adjusted using a tip set screw 130. The tip set screw 130 may be inserted into the spring sleeve 160, 260 of the distraction hinge 100, 200. The distraction biasing force may be increased by screwing the tip set screw down, while the distraction biasing force may be decreased by screwing the tip set screw 130 on the distraction hinge 100, 200 up. The distraction biasing force may be adjusted as needed to separate the spine vertebrae 400 with the desired distraction biasing force until the spine is in a healthy alignment.

The figures show unidirectional motion; however, other embodiments may apply multidirectional motion to the vertebrae 400 by changing the location of the pedicle screws 410 and/or the applied distraction forces of the distraction hinges 100, 200. The device for correcting spine deformities may further impart stress distribution across spinal endplates, that is titratable, and does not rely on compressive forces alone.

A motion/growth restrictor (larger diameter set screw which may or may not be conical may be placed through the central housing's 110, 210 topside. This may be adjusted to further restrict motion and may be used to apply the appropriate load to restriction arms within the central housing 110, 210. By inserting the screw further, downward pressure may be applied to the sleeves within the central housing 110, 210, this imparts a downward force on the arms that through the hinge converts this unidirectional load into a torque, the center of which is each sleeve/housing unit hinge. Through the attachment of the sleeve to a rigidly fixed rod/screw construct, the downward force of the screw, imparts a torque on the sleeve, as the center of rotation of this sleeve is NOT at the center of rotation of the deformity or the spine, the torque imparted on the sleeve imparts a torque, compression, distraction and a translational force on the attached vertebrae. Doing so, a stress differential across the vertebral endplate is made. By knowing and controlling the torque on the screw, the downward force to the attached sleeves can be calculated and thus the forces to the vertebral body through the rod/screw and stress distribution across the endplate, without causing catastrophic bone failure.

The distraction hinge 100, 200 may be of any desired design. In preferred embodiment, the distraction hinge 100, 200 is able to create a biasing force that separates spine vertebra 400 from each other using a distraction force (as opposed to a compression force). In a preferred embodiment, the distraction hinge 100, 200 separates the spine vertebra along a center of rotation. In an example embodiment, the distraction hinge 100, 200 has a first and a second spinal rod sleeves 170 for receiving either an end of a spinal rod 140 or an end of a rod-to-hinge connector 420. The distraction hinge 100, 200 may also include a spring 120. A tip set screw 130 may be screwed down on the distraction hinge 100, 200 to compress the spring 120 and cause a distraction force on the ends of the spinal rods 140 attached to the distraction hinge 100, 200 to separate the spine vertebra 400, preferably along a center of rotation. In other embodiments, the distraction hinge 100, 200 enables a center of rotation away from a vertebral cortex. This method avoids applying a compression force on the spine vertebrae 400 that might damage its natural growth.

The spinal rod sleeves 170, 270 may be completely cylindrical or be "top loading" in that the spinal rod 140 may be dropped into the top of the spinal rod sleeve 170, 270. The spinal rod 140 may be attached to the straight central housing 110 or the angled central housing 210 using any desired technique. As non-limiting examples, an end of the spinal rod 140 may be attached in the straight central housing spinal rod sleeves 170 or the angled central housing spinal rod sleeves 270 using one or more swage pins 150 or one or more set screws. The swage pins 150 have the advantage of allowing the end of the spinal rod 140 to pivot or rotate within the central housing 110, 210 during the healing process. In other embodiments, set screws may be tightened to fix the spinal rod 140 into the spinal rod sleeve 170, 270 of the central housing 110, 210 to prevent movement.

Each spinal rod sleeve 170, 270 may be attached to a central housing 110, 210 though a "hinge." A "restriction arm" may extend past the location of the hinge centrally into the central connector. In this embodiment the hinge can be uniplanar, although it could be replaced with a ball in socket type hinge in other iterations. This central housing 110, 210 allows directional movement in one direction through a covered top and a covered bottom slot 190, 290. (Once again in multi directional unit this would be altered). The slot 190, 290 may be placed facing the spine, the covered top is placed away from the spine (and away from the concavity). The covered top (no notch or slot 190, 290) prevents the sleeves from rotating up in that direction, whereas the slot allows the spinal rods 140 to pass freely in the other direction.

Figure 3:
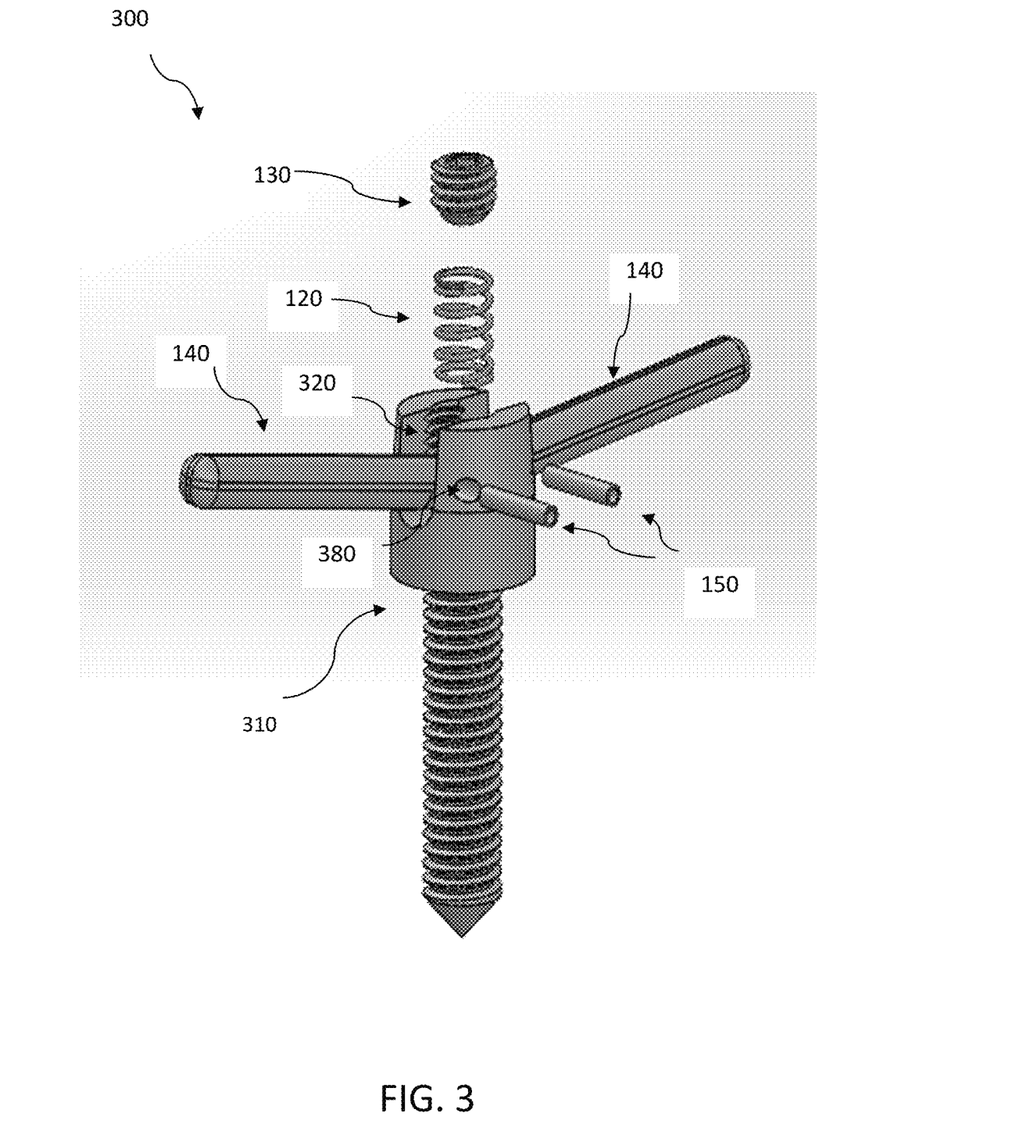
FIG. 3 depicts a perspective view for an assembly where a pedicle screw acts as a central housing.

Referring to FIG. 3, an assembly for a pedicle central housing 300 is illustrated where a pedicle central housing 310 acts as a distraction hinge or a central housing that is directly attached to a vertebra. This embodiment of a pedicle central housing 300 is in contrast to the distraction hinges 100, 200 illustrated in FIGS. 1 and 2 that are positioned between vertebra 400 and are not directly fixed to any vertebra 400. The pedicle central housing 310 may have a pedicle central housing slot 320 that may receive ends of two spinal rods 140. A spring 120 may also be inserted into the pedicle central housing slot 320 of the pedicle screw 310. Swage pins 150 may be used to attach the ends of two spinal rods 140 to the pedicle central housing slot 320 in such a manner that the spinal rods 140 may pivot or rotate inside the pedicle central housing slot 320. A tip set screw 130 may also be inserted into the pedicle central housing slot 320 to compress the spring 120 and apply a desired biasing force on the ends of the spinal rods 140 which may be used to correct a deformity in the vertebrae 400.

Figure 9:
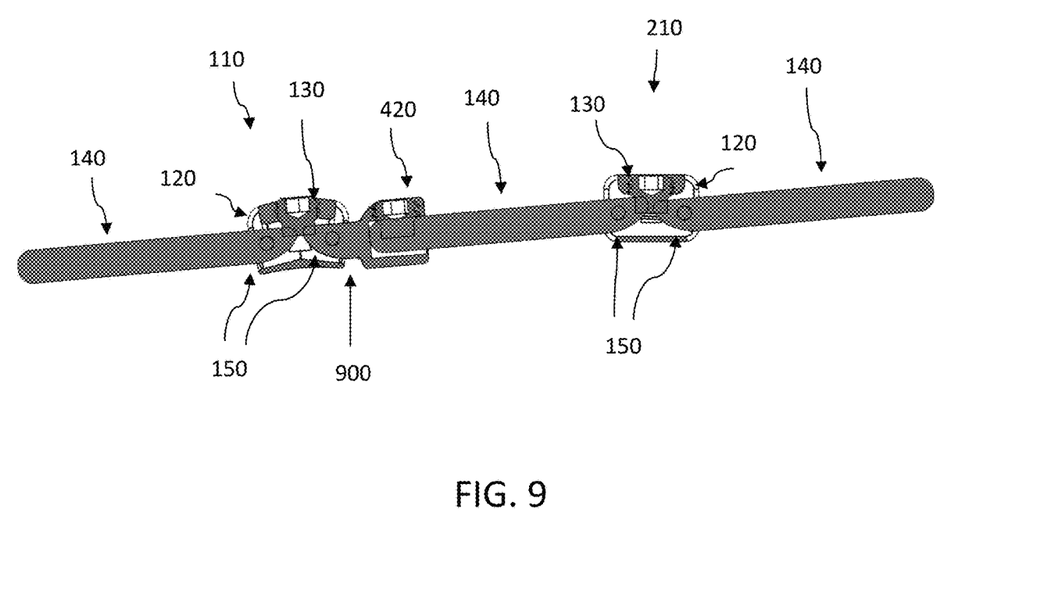
FIG. 9 depicts a cross-sectional perspective view of an embodiment of the invention.

Referring to FIGS. 6 and 9, a portion of an embodiment of the instrumented system is illustrated (the pedicle screws are not shown so as to simply the illustration and the following description). In this example arrangement of components, three spinal rods 140, a straight central housing 110, an angled central housing 210, and a rod-to-hinge connector 420 are illustrated. The distraction hinge 100, 200 may include a spinal rod end to end connector that is essentially comprised of 4 main portions (e.g., (2) spinal rod sleeves 170, 270, a central housing 110, 210, a motion restrictor/growth modulator tip set screw 130) and two swage pins 150 per distraction hinge 100, 200 or two to four set screws. It should be appreciated that other numbers of set screws may be used. In an example embodiment, each spinal rod 140 (these may range from 2.5 mm to 7.0 mm) may be attached to the central housing 110, 210. The central housing 110, 210 may accept one spinal rod proximally and one spinal rod distally. The central housing 110, 210 and spinal rod sleeves 170, 270 may be appropriately upsized to allow the proper diameter of the spinal rod 140, so that each spinal rod 140 may be inserted into a corresponding slightly larger hollow connector spinal rod sleeve 170. While the spinal rods 140 may be any desired shape, the spinal rods 140 are preferably straight. In some embodiments, the spinal rods 140 may be curved in one or more planes which would permit distraction biasing forces being applied by the distraction hinge 100, 200 to the vertebrae 400 in multiple planes.

Another example embodiment of a device for correcting a spine deformity will now be provided. In this embodiment, a device is configured to encourage a corrective vertebral growth between a first spine vertebra and a second spine vertebra. The device includes a first pedicle screw 410 configured to be attached to the first spine vertebra and a second pedicle screw 410 configured to be attached to the second spine vertebra. The device has a first spinal rod 140 configured to be positioned in a top or head portion of the first pedicle screw 410. A first tip set screw may be configured to be screwed into the top portion of the first pedicle screw 410 to securely hold a part of the first spinal rod 140 in the top or head portion of the first pedicle screw 410. A second rod 140 may be configured to be positioned in a top or head portion of the second pedicle screw 410. A second tip set screw 130 may be configured to be screwed into the top or head portion of the second pedicle screw 410 to securely hold a part of the second spinal rod 140 in the top or head portion of the second pedicle screw 410. The device further has a distraction hinge 100, 200. The distraction hinge 100, 200 comprises a first spinal rod sleeve 170, 270 configured to receive a terminal end of the first spinal rod 140 and a second spinal rod sleeve 170, 270 configured to receive a terminal end of the second spinal rod 140. The distraction hinge 100, 200 also includes a spring sleeve 160, 260, a first pair of swage pin sleeves 180, 270 and a second pair of swage pin sleeves. In preferred embodiments, a spring 120 may be configured to be placed in the spring sleeve 160, 260. A first swage pin 150 may be configured to pass through the first pair of swage pin sleeves 180 while passing through a spinal rod aperture 680 in the terminal end of the first spinal rod 140. A second swage pin 150 may be configured to pass through the second pair of swage pin sleeves 180, 280 while passing through a spinal rod aperture 680 in the terminal end of the second spinal rod 140. A tip set screw 130 may be configured to adjustably increase or decrease a biasing force on the distraction hinge spring 120 that increases or decreases a distraction biasing force applied to the first spine vertebra and the second spine vertebra.

In some embodiments, the above described device may include a rod-to-hinge connector 420. The rod-to-hinge connector 420 may have a first appendage 900 configured to enter the second spinal rod sleeve 170, 270 of the distraction hinge 100, 200, a first spinal rod sleeve 170, 270 configured to receive the terminal end of the second spinal rod 140, and a second tip set screw sleeve configured to receive a rod-to-hinge tip set screw 630. The rod-to-hinge tip set screw 630 may be configured to be screwed into the second tip set sleeve of the rod-to-hinge connector 420 to securely attach the terminal end of the second spinal rod 140 to the second spinal rod sleeve 170, 270 of the distraction hinge 100, 200.

In some embodiments, the first spinal rod 140 and the second spinal rod 140 are configured to apply a distraction biasing force on the first spine vertebra and the second spine vertebra.

In some embodiments, the distraction hinge tip set screw 130 is further configured to move a center of rotation of the first spine vertebra and the second spine vertebra to a fixed point that allows for differential stress distribution across a vertebral endplate.

In some embodiments, the first and second swage pins 150 are configured to allow the terminal end of the first and second spinal rods 140 to pivot around the first and second swage pins 150 inside the distraction hinge 100, 200.

Figure 10:
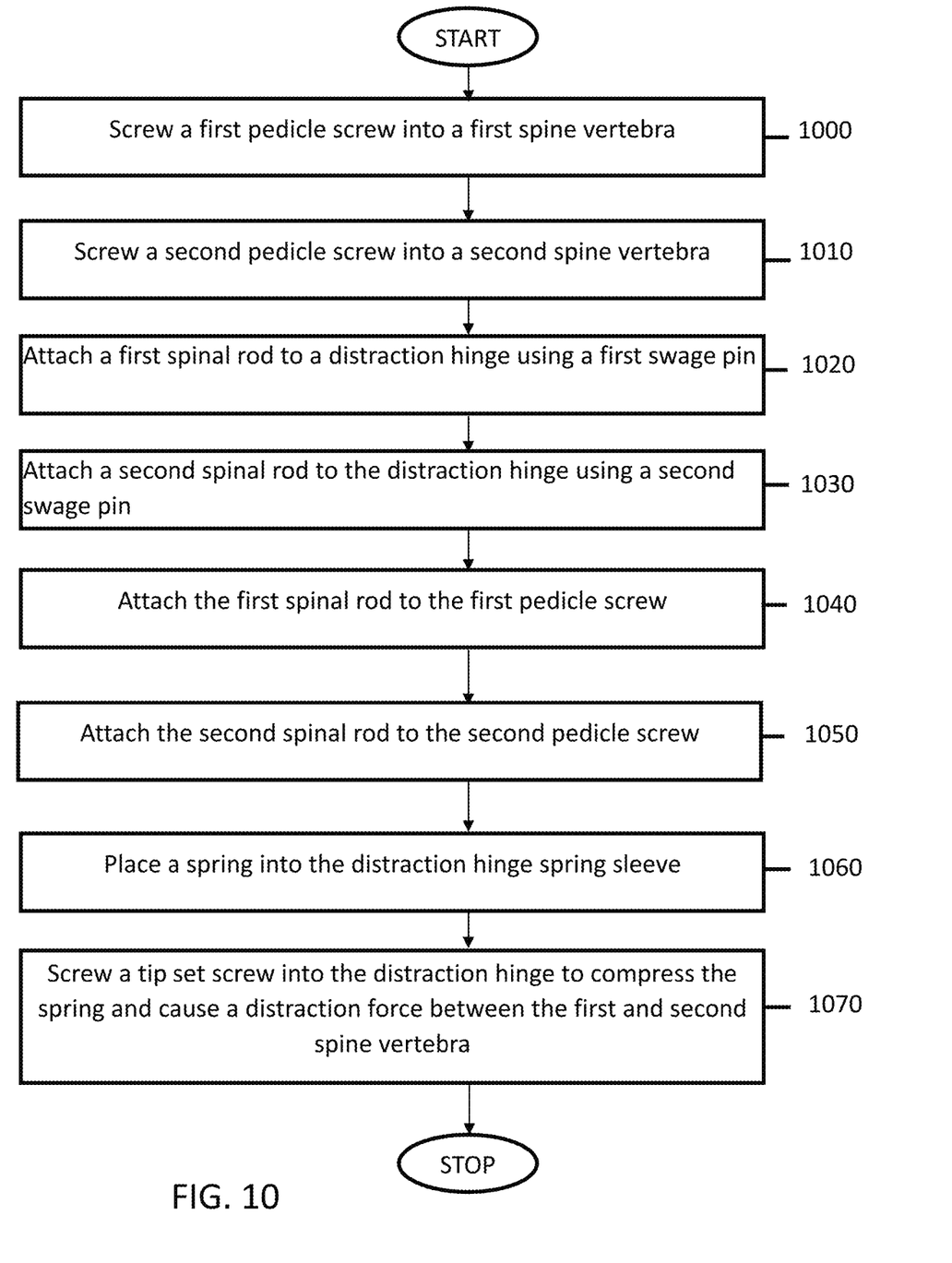
FIG. 10 is a flowchart of a possible method of practicing the invention.

Referring to FIG. 10, a method is provided for straightening a deformed curved spine having an outer curved surface and an inner curved surface. The method includes screwing a first pedicle screw 410 into a first spine vertebra 400 along the outer curved surface 430 of the curved spine (step 1000) and screwing a second pedicle screw 410 into a second spine vertebra 400 along the outer curved surface 430 of the curved spine (step 1010).

The pedicle screws 410 attached to the vertebrae are the fixed anchor points upon which the distraction hinges 100, 200 operate. A first end of a first spinal rod 140 may be attached into a first spinal rod sleeve 170, 270 of a distraction hinge using a first swage pin (step 1020) and a first end of a second spinal rod 140 may be attached into a second spinal rod sleeve 170, 270 of the distraction hinge 100, 200 using a second swage pin 150 (step 1030).

A second end of the first spinal rod 140 may be attached to a head of the first pedicle screw 410 using a first tip set screw (step 1040) and a second end of the second spinal rod 140 may be attached to a head of the second pedicle screw 410 using a second tip set screw 130 (step 1050).

A spring may be placed into a spring sleeve 160, 260 of the distraction hinge 100, 200 (step 1060). A tip set screw 130 may be screwed into the distraction hinge 100, 200 (step 1070) to compress the spring 120 so as to push on the first end of the first spinal rod 140 and the first end of the second spinal rod 140 to thereby cause a distraction force between the first spine vertebra and the second spine vertebra.

Another example procedure for installing the device may be as follows:
1. Standard pedicle/vertebral screw 410 fixation will be placed into the proximal vertebra 400 and distal vertebral body 400.
2. Small spinal rods 140 are attached to each of the pedicle/vertebral screws.
3. The small spinal rods 140 are then reduced to the reduction spinal rod sleeves 170, 270 of the device. A specialized spinal rod pusher that has an inline load cell could give the user a sense of the force being applied to the device and the spinal rod 140 could be bent to lower that force and prevent screw failure. This device isn't necessary but would add a level of precision to the procedure.
4. Once the spinal rods 140 are inserted into the spinal rod sleeves 170, 270, the spinal rods 140 are held to the sleeves through the locking set screws or through swage pins 150.
5. If additional corrective force and stress distribution across the growth plate is desired, the central housing growth restricting tip set screw 130 can be inserted which will push down on the ends of the spinal rod sleeves 170, 270. Through a series of calculations based on the length of screw, the length of rod, diameter of vertebral body, and a screw driver that measures or limits torque, maximal stress distribution can be achieved.
6. Once the curve correction has been achieved, the device can be removed to allow normal motion. Many factors can affect the healing process of the spine after spinal deformity surgery, such as the severity of the original curve in the spine as well as the age and health of the patient. However, it generally takes three to four months for the bones to heal well, while the healing process may continue for more than a year.

The pedicle screws 410 may be mechanically connected together, i.e., interlinked with each other, using a combination of spinal rods 140, distraction hinges 100, 200 and/or rod-to-hinge connectors 420.

For case of explanation, the embodiments have generally been described for the condition kyphosis (an exaggerated, forward rounding of the upper back). However, the invention is not so limited and may be used on any portion of the spine for any level of deformity. Also for ease of explanation, the example embodiments have been described as being attached to the posterior (back) of the spine to modulate growth in the sagittal plane. However, the invention is not so limited and may be attached anteriorly (or even unilaterally posteriorly) to modulate growth in different planes (such as anteriorly to correct coronal deformities).

Another unique aspect or benefit is that the invention may be used adjacent to vertebral levels treated with routine instrumentation and fusion to minimize the number of vertebral levels being fused. The invention is designed to accommodate standard fixed rods used in fusions so that the "ends" of a deformity can be modulated to grow straight even if the central portions of the curve cannot successfully be modulated.

If the described embodiments are used in conjunction with instrumented fusion, the described embodiments may allow a decreased risk of proximal junctional kyphosis, by less rigidly fixing the proximal levels of a construct allowing them to grow (modulate) straight.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed:

1. A device that is configured to allow a corrective vertebral growth between a first spine vertebra and a second spine vertebra, comprising:
    a first pedicle screw configured to be attached to the first spine vertebra;
    a second pedicle screw configured to be attached to the second spine vertebra;
    a first spinal rod configured to be positioned in a top portion of the first pedicle screw;
    a first tip set screw configured to be screwed into the top portion of the first pedicle screw to securely hold a part of the first spinal rod in the top portion of the first pedicle screw;
    a second spinal rod configured to be positioned in a top portion of the second pedicle screw;
    a second tip set screw configured to be screwed into the top portion of the second pedicle screw to securely hold a part of the second spinal rod in the top portion of the second pedicle screw;
    a distraction hinge, comprising:
        a first spinal rod sleeve configured to receive a terminal end of the first spinal rod,
        a second spinal rod sleeve configured to receive a terminal end of the second spinal rod,
        a distraction hinge spring sleeve,
        a first pair of swage pin sleeves, and
        a second pair of swage pin sleeves;
    a distraction hinge spring configured to be placed in the distraction hinge spring sleeve;
    a first swage pin configured to pass through the first pair of swage pin sleeves in the distraction hinge while passing through a spinal rod sleeve in the terminal end of the first spinal rod;
    a second swage pin configured to pass through the second pair of swage pin sleeves in the distraction hinge while passing through a spinal rod sleeve in the terminal end of the second spinal rod; and
    a distraction hinge tip set screw configured to adjustably increase or decrease a biasing force on the distraction hinge spring that increases or decreases a distraction biasing force applied to the first spine vertebra and the second spine vertebra.

2. The device of claim 1, further comprising:
    a rod-to-hinge connector, comprising:
        a first appendage configured to enter the second spinal rod sleeve of the distraction hinge,
        a first sleeve configured to receive the terminal end of the second spinal rod, and
        a second sleeve configured to receive a rod-to-hinge tip set screw; and
    the rod-to-hinge tip set screw configured to be screwed into the second sleeve of the rod-to-hinge connector to securely attach the terminal end of the second spinal rod to the second spinal rod sleeve of the distraction hinge.

3. The device of claim 1, wherein the first spinal rod and the second spinal rod are configured to apply a distraction biasing force on the first spine vertebra and the second spine vertebra.

4. The device of claim 1, wherein the first pedicle screw is configured to be attached to the first spine vertebra by screwing the first pedicle screw into the first spine vertebra.

5. The device of claim 4, wherein the second pedicle screw is configured to be attached to the second spine vertebra by screwing the second pedicle screw into the second spine vertebra.

6. The device of claim 1, wherein the distraction hinge tip set screw is further configured to move a center of rotation of the first spine vertebra and the second spine vertebra to a fixed point that allows for differential stress distribution across a vertebral endplate.

7. The device of claim 1, wherein the first swage pin is configured to allow the terminal end of the first spinal rod to pivot around the first swage pin inside the distraction hinge.

8. The device of claim 7, wherein the second swage pin is configured to allow the terminal end of the second spinal rod to pivot around the second swage pin inside the distraction hinge.

9. A device that applies a distraction force on parts of an outer curved surface, comprising:
    a first pedicle screw configured to be attached to a first part of the outer curved surface;
    a second pedicle screw configured to be attached to a second part of the outer curved surface;
    a first spinal rod configured to be positioned in a head of the first pedicle screw;
    a first tip set screw configured to be screwed into the head of the first pedicle screw to securely hold a part of the first spinal rod in the head of the first pedicle screw;
    a second spinal rod configured to be positioned in a head of the second pedicle screw;
    a second tip set screw configured to be screwed into the head of the second pedicle screw to securely hold a part of the second spinal rod in the head of the second pedicle screw;
    a distraction hinge, comprising:
        a first sleeve configured to receive a terminal end of the first spinal rod,
        a second sleeve configured to receive a terminal end of the second spinal rod,
        a distraction hinge spring sleeve,
        a first pair of swage pin sleeves, and
        a second pair of swage pin sleeves;
    a distraction hinge spring configured to be placed in the distraction hinge spring sleeve;
    a first swage pin configured to pass through the first pair of swage pin sleeves in the distraction hinge while passing through a spinal rod sleeve in the terminal end of the first spinal rod;

a second swage pin configured to pass through the second pair of swage pin sleeves in the distraction hinge while passing through a spinal rod sleeve in the terminal end of the second spinal rod; and a distraction hinge tip set screw configured to adjustably increase or decrease a biasing force on the distraction hinge spring that increases or decreases a distraction biasing force applied on the first part and the second part of the outer curved surface.

10. The device of claim 9, further comprising:
a rod-to-hinge connector, comprising:
  a first appendage configured to enter a second spinal rod sleeve of the distraction hinge,
  a first sleeve configured to receive the terminal end of the second spinal rod, and
  a second sleeve configured to receive a rod-to-hinge tip set screw; and
the rod-to-hinge tip set screw configured to be screwed into the second sleeve of the rod-to-hinge connector to securely attach the terminal end of the second spinal rod to the second spinal rod sleeve of the distraction hinge.

11. The device of claim 9, wherein the first spinal rod and the second spinal rod are configured to apply a distraction biasing force on the first part and the second part of the outer curved surface.

12. The device of claim 9, wherein the first pedicle screw is configured to be attached to the first part of the outer curved surface by screwing the first pedicle screw into the first part of the outer curved surface.

13. The device of claim 12, wherein the second pedicle screw is configured to be attached to the second part of the outer curved surface by screwing the second pedicle screw into the second part of the outer curved surface.

14. The device of claim 9, wherein the distraction hinge tip set screw is further configured to move a center of rotation of the first part of the outer curved surface and the second part of the outer curved surface to a fixed point that allows for differential stress distribution across the outer curved surface.

15. The device of claim 9, wherein the first swage pin is configured to allow the terminal end of the first spinal rod to pivot around the first swage pin inside the distraction hinge.

16. The device of claim 15, wherein the second swage pin is configured to allow the terminal end of the second spinal rod to pivot around the second swage pin inside the distraction hinge.

17. A method of straightening a curved spine having an outer curved surface and an inner curved surface, comprising the steps of:

screwing a first pedicle screw into a first spine vertebra along the outer curved surface of the curved spine;

screwing a second pedicle screw into a second spine vertebra along the outer curved surface of the curved spine;

attaching a first end of a first spinal rod into a first distraction hinge spinal rod sleeve of a distraction hinge using a first swage pin;

attaching a first end of a second spinal rod into a second distraction hinge spinal rod sleeve of the distraction hinge using a second swage pin;

attaching a second end of the first spinal rod to a head of the first pedicle screw using a first tip set screw;

attaching a second end of the second spinal rod to a head of the second pedicle screw using a second tip set screw;

placing a spring into a distraction hinge spring sleeve of the distraction hinge; and screwing a tip set screw into the distraction hinge to compress the spring so as to push on the first end of the first spinal rod and the first end of the second spinal rod to thereby cause a distraction force between the first spine vertebra and the second spine vertebra.

18. The method of claim 17, wherein the distraction hinge comprises a straight central housing.

19. The method of claim 18, wherein the distraction hinge comprises an angled central housing.

20. The method of claim 17, wherein the tip set screw is further configured to move a center of rotation of the first spine vertebra and the second spine vertebra to a fixed point that allows for differential stress distribution across the curved spine.

* * * * *